United States Patent [19]
Gregory

[11] Patent Number: 5,485,141
[45] Date of Patent: Jan. 16, 1996

[54] LOGALERT

[76] Inventor: Jay D. Gregory, 2237 E. Acoma Dr., Phoenix, Ariz. 85022-4101

[21] Appl. No.: 95,677

[22] Filed: Dec. 17, 1993

[51] Int. Cl.⁶ .................................................. B60Q 1/00
[52] U.S. Cl. ................................................... 340/457
[58] Field of Search .................. 340/457, 457.1, 340/457.3, 457.4, 576; 377/20, 13; 368/5

[56] References Cited

U.S. PATENT DOCUMENTS

| Re. 32,655 | 4/1988 | Levine | 364/569 |
|---|---|---|---|
| 3,808,592 | 4/1974 | Wright | 340/522 |
| 3,831,707 | 8/1974 | Takeuchi | 340/576 |
| 4,338,512 | 7/1982 | Ludwig | 377/20 |
| 4,380,752 | 4/1983 | Reynolds | 340/457 |
| 4,871,994 | 10/1989 | Takeda et al. | 340/457 |

*Primary Examiner*—Brent A. Swarthout
*Assistant Examiner*—Nina Tong

[57] ABSTRACT

A truck alarm system emitting an audible tone and lighting lights every time the ignition switch is turned on and when the parking brake knob is pulled out or pushed in with the ignition switch in the on position. With the timer switch in the on position the system will automatically activate every two hour period. In either case the system can be deactivated by pushing on the reset switch.

2 Claims, 4 Drawing Sheets

LOGALERT

FIELD OF THE INVENTION

This invention relates to commercial trucking, specifically to the filling out of the drivers log book.

BACKGROUND

Drivers of commercial trucks are required by law to fill out a log book showing their activities for each 24 hour period beginning and ending at midnight.

Originally the drivers of commercial trucks had to remember to fill out their log books. The log book was often kept in a pouch on the drivers door where it was out of sight and often forgot about which resulted in tickets being issued for log book violations costing the drivers from a few to several hundred dollars.

OBJECTS AND ADVANTAGES

Accordingly, several objects and advantages of my invention are:

(a) a reminder to do a pre trip inspection.

(b) a reminder to fill out the log book before the trip is started.

(c) a reminder to fill out the log book any time the parking brakes are set.

(d) a reminder to fill out the log book any time the parking brakes are released.

(e) a reminder to check the truck and trailer tires every two hours when hauling hazardous materials.

(f) a reminder to keep the log book current within two hours in California.

Further objects and advantages of my invention will become apparent from the consideration of the drawings and ensuing description.

The logalert is fastened to the dash of a commercial truck by a suitable means and receives its power through red+wire (40) which is connected to the normally open lug on the ignition switch (not shown) and the black–wire (50) which is connected to ground. When the ignition switch is turned on the unit will be activated causing an audible tone to be emitted through hole (100), light lights (90) and light (140). The unit can be deactivated by pushing on the reset (110) which will cause the audible tone to stop, the lights (90) to go out but will leave light (140) lit.

When the parking brake knob (120) FIG. 3 is pulled to set the brakes, a magnetic material (60) fastened by a suitable means around the base of said knob will leave the close proximity to the magnetic switch (70) fastened to the dash by a suitable means causing the contacts in the switch to open thereby activating an audible tone through hole (100) and light lights (90). The unit can be deactivated by pushing on the reset (110).

When the parking brake knob (120) FIG. 3 is pushed to release the brakes, the magnetic material (60) around the base of said knob will come in close proximity to the magnetic switch (70) causing the contacts in the switch to close thereby activating an audible tone through hole (100) and light lights (90). The unit can be deactivated by pushing on reset (110).

When switch (130) FIG. 1 is set to the on position the unit becomes a 2 hour timer and light (140) will pulsate as an indication that the timer is on. After a 2 hour period the unit FIG. 2 will automatically be activated causing an audible tone to be emitted through hole (100) and light lights (90). The unit can be deactivated by pressing the reset which will stop the audible tone through hole (100), turn off the lights (90), and reactivate the two hour timer. The unit will still operate off the parking brake knob (120) FIG. 3 when the timer is activated.

DRAWING FIGURES

Figure 1:
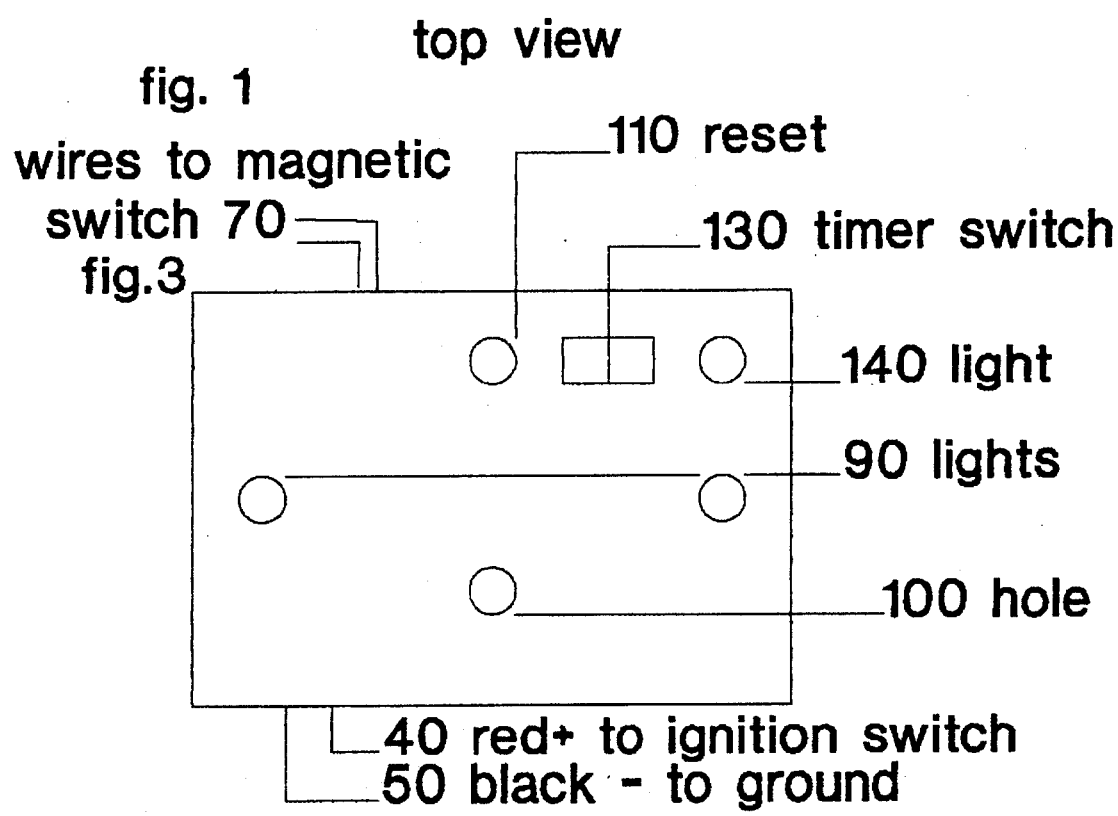
FIG. 1 shows the top view of the logalert unit with the locations of the various lights and switches.
Figure 2:
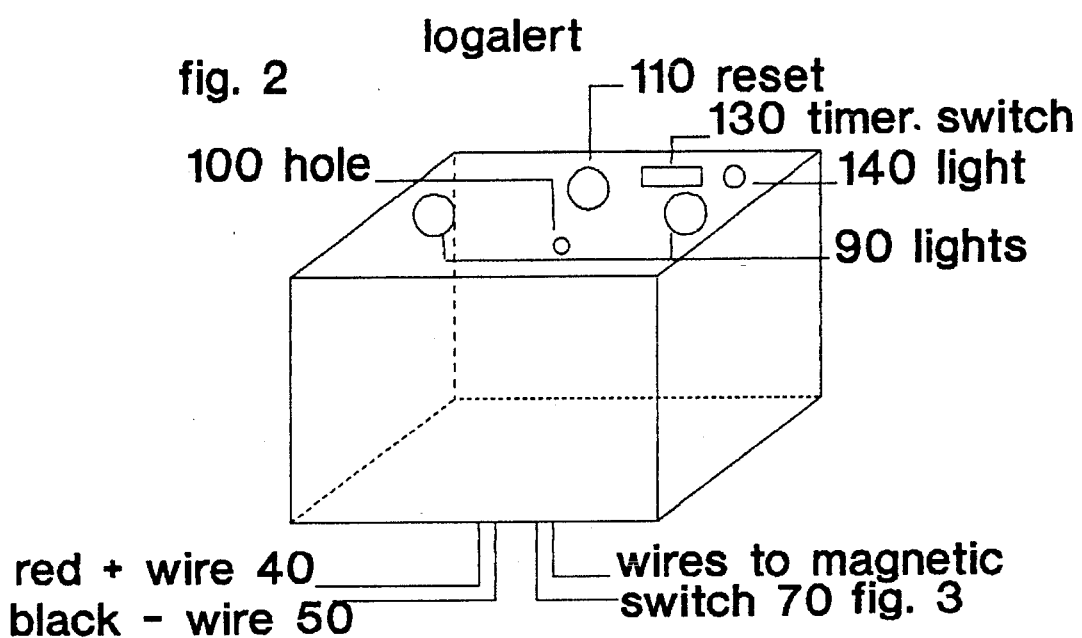
FIG. 2 shows a general overall view of the logalert.
Figure 3:
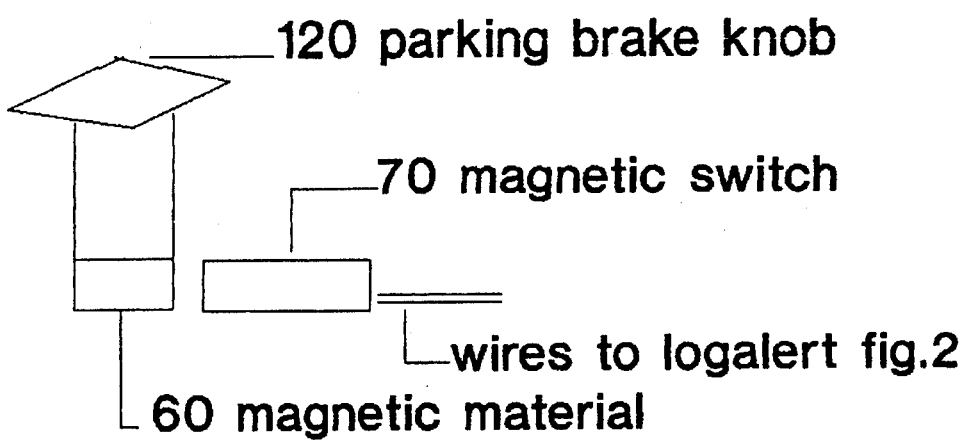
FIG. 3 shows the parking brake knob with the magnetic material and the close proximity of the magnetic switch.
Figure 4:
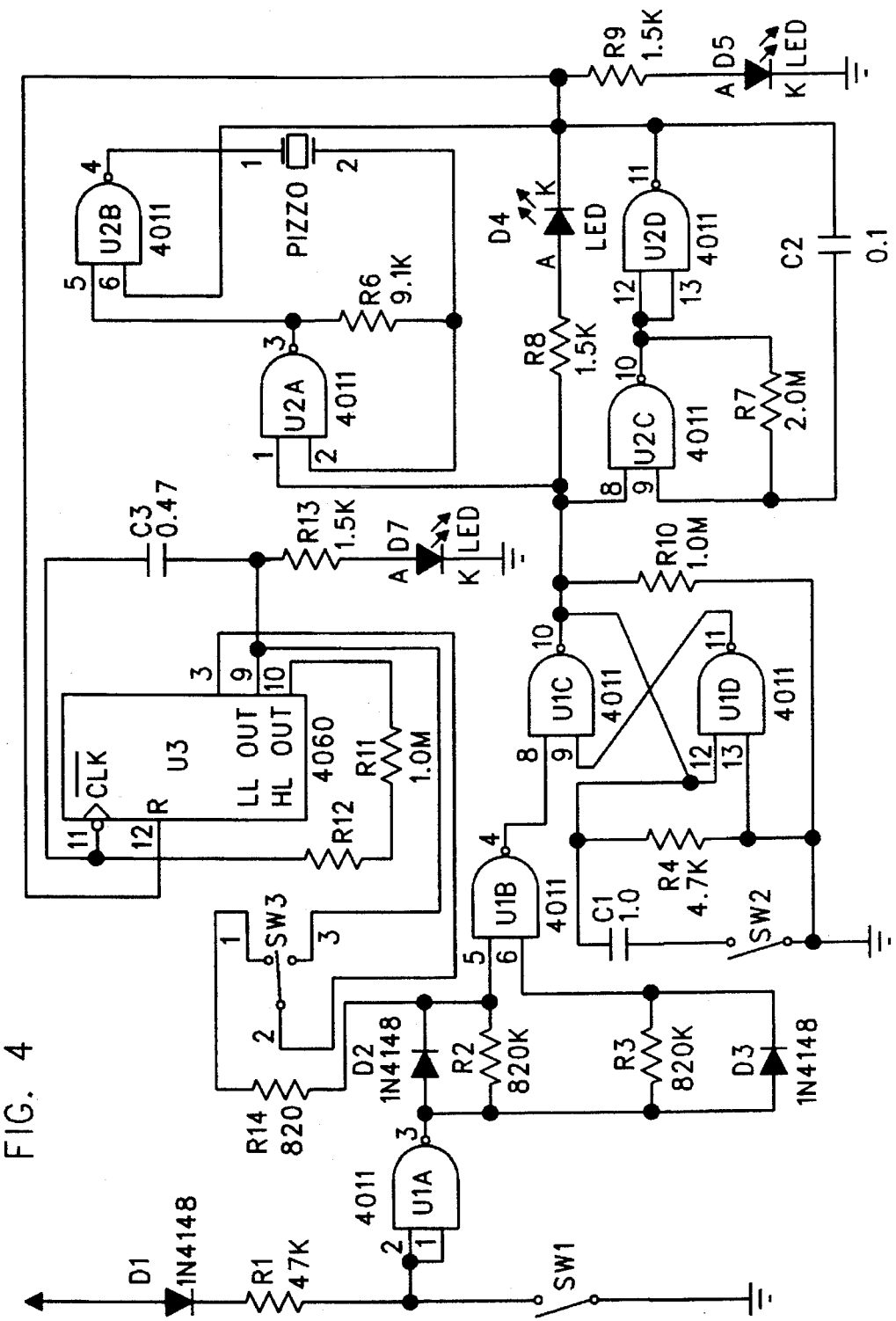

FIG. 4 is the schematic diagram of the embodiment of FIG. 2. U1A and U1B detects a change in Sw1 from an off state to an on state and an on state to an off state that trips U1C and U1D which is a one shot flip flop. The output high starts the oscillator driver circuit for the LEDs and alarm which is U2C and U2D. That in turn drives the audio driver U2A and U2B. U3 is an oscillator divider providing the time for the timed circuit. The timer output starts the one shot flip flop for the alarm and LEDs. Sw2 resets the flip flop to low shutting off the LED and alarm oscillator driver circuit and rsetting the oscillator divider circuit U3.

Reference numerals in drawing 40 red+wire 100 hole
50 black—wire 110 reset
60 magnetic material 120 parking brake knob
70 magnetic switch 130 timer switch
90 light 140 light

SUMMARY, RAMIFICATIONS AND SCOPE

Accordingly, the reader will see that the use of this invention will be a great advantage to the drivers of commercial trucks as it will remind them to fill out their log books on a regular basis. Furthermore it will be a great advantage to the general public because of additional advantages in that

* it reminds the driver to do a pre trip inspection of the truck insuring the general public that the truck is in good operating condition.

* it reminds the haulers of hazardous materials to check their tires at a 2 hour interval to insure that the tires are not wearing or hot enough to cause a blow out which could cause serious damage, death or environmental damage.

Although the above descriptions contain many specifications, these should not be construed as limiting the scope of the invention but as merely providing illustrations of the presently preferred embodiments of the invention. For example the invention can have different shapes such as round to match the gauges on the dash, an internal mechanical switch could be used there-by eliminating the magnetic material and the magnetic switch and the different components can be incorporated to the various existing systems of a truck.

I claim:

1. An alarm system for reminding the driver of a commercial truck to fill out a log book, which comprising:

electronic components comprising integrated circuits, resistors, diodes, switches and a sound emitting device connected to an electrical circuit board;

a power supply means for supplying 12 volts D.C. to said electrical circuit board;

a housing means for housing said circuit board, said diodes and said switches;

a magnetic material means connecting around a parking brake knob;

a magnetic switch means connecting around the base of said knob, when said parking brake knob is pulled out, said magnetic material means leaves the close proximity of said magnetic switch means such that said magnetic switch means moves from closed to open position and causes said electrical circuit board to activate said diodes to light and said sound emitting device to emit a tone for alerting said driver to fill out said log book, and deactivating means for deactivating said alarm system by said driver activating a reset button of said deactivating means;

wherein said magnetic material means comes in close proximity to said magnetic switch means causing said magnetic switch means to close when said parking brake knob is pushed in, causing said electrical circuit board to activate said diodes to light and said sound emitting device to emit a tone for alerting said driver to fill out the log book, and deactivating the alarm system by activating said reset button of said deactivating means;

wherein one of said switches comprising a timer switch means, wherein said timer switch means is caused to activate a two hour timer such that said electrical circuit board, said diodes and said sound emitting device are activated every two hour period, and deactivating said timer switch means by activating said reset button of said deactivating means;

electrical wires connecting said magnetic switch means to said electric circuit board;

whereby pushing on said reset button causes said electrical circuit board to deactivate causing said diodes to stop lighting and said sound emitting device to stop emitting a tone.

2. The alarm system according to claim 1, wherein said diodes and said sound emitting device are incorporated within the instrument panel of said truck;

said electrical wires connecting said diodes and said sound emitting device to said housing means housing said electrical circuit board;

said electrical wires connecting said reset switch to said electrical circuit board.

* * * * *